United States Patent [19]
Akao et al.

[11] Patent Number: 4,907,330
[45] Date of Patent: Mar. 13, 1990

[54] SINTERED BODY ASSEMBLY FORMED FROM A PLURALITY OF INDEPENDENT COMPACTS AND METHOD OF PRODUCING SAME

[75] Inventors: Shigeaki Akao; Masakatu Hayakawa; Mitsuyoshi Kawamura, all of Nagoya, Japan

[73] Assignee: NGK Spark Plug Co., Ltd., Nagoya, Japan

[21] Appl. No.: 202,295

[22] Filed: Jun. 6, 1988

[30] Foreign Application Priority Data

Jun. 4, 1987 [JP] Japan .................................. 62-138882
Aug. 31, 1987 [JP] Japan ........................... 62-132330[U]
Dec. 17, 1987 [JP] Japan .................................. 62-317383

[51] Int. Cl.$^4$ .......................... B21K 1/20; B23P 15/02
[52] U.S. Cl. .................................. 123/90.51; 29/508; 29/447; 29/888.03; 29/888.43
[58] Field of Search ................... 29/156.7 R, 156.7 A, 29/156.7 B, 156.7 C, 506, 508, 447; 419/2, 28; 123/197 P, 198 R, 90.48, 90.51

[56] References Cited
U.S. PATENT DOCUMENTS

| 4,251,273 | 2/1981 | Smith et al. | 419/28 |
| 4,364,159 | 12/1982 | Holcombe | 29/447 X |
| 4,419,413 | 12/1983 | Ebihara | 419/2 X |
| 4,793,968 | 12/1988 | Mosser et al. | 419/2 X |

Primary Examiner—Timothy V. Eley
Attorney, Agent, or Firm—Foley & Lardner, Schwartz, Jeffery, Schwaab, Mack, Blumenthal & Evans

[57] ABSTRACT

A sintered body assembly having an inner section and an outer section is formed from independent inner and outer compacts corresponding to the inner and outer sections, respectively. The inner and outer compacts are so shaped that a predetermined clearance is provided therebetween. The outer compact is larger in shrinkage percentage at the time of sintering than the inner compact such that the clearance is filled by the compacts at the time of sintering thereby allowing the compacts to be formed into a single sintered body or an integral unit.

27 Claims, 4 Drawing Sheets

FIG. 3
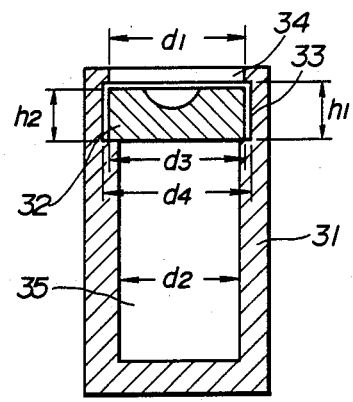
FIG. 4A   FIG. 4B
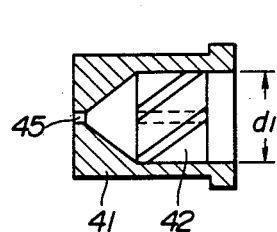 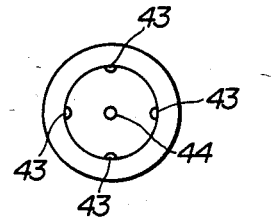

SINTERED BODY ASSEMBLY FORMED FROM A PLURALITY OF INDEPENDENT COMPACTS AND METHOD OF PRODUCING SAME

BACKGROUND OF THE INVENTION

1. Field of the Invention

The present invention relates to a sintered body assembly formed from a plurality of compacts which are prepared independently and joined together at the time of sintering and a method of producing such a sintered body assembly.

2. Description of the Prior Art

A method of producing a sintered body assembly of the above described kind is known as disclosed by Japanese provisional patent publication No. 60-11276. By this method, a plurality of independent compacts composed of inorganic powder or powders are prepared by cold isostatic pressing in such a way that the densities of the compacts approximate to each other. The compacts are assembled by cold isostatic pressing and thereafer subjected to firing or sintering.

A method of producing a turbine rotor is known as disclosed by Japanese provisional patent publicaton No. 55-75504. By this method, a compact for a rotor hub having at the outer periphery a plurality of grooves at a predetermined interval is prepared by hot pressing. A plurality of compacts for vanes are prepared by injection molding and fitted in the grooves of the compact for the hub. After assembly, the compacts are subjected to firing or sintering and formed into an integral body.

A problem of the prior art methods is that cracks, breakage, imcomplete joining, etc. are liable to occur in the products. This is because that the compacts to be assembled require a relatively strict approximation in density.

Another problem is that in case of the method disclosed by Japanese provisional publication No. 60-11276 a difficult process of subjecting the compacts to cold isostatic pressing is required after assembly. In case of the method disclosed by Japanese provisional patent publication No. 55-75504, cracks, incompete joining, etc. are liable to result from a relatively small error in the shrinkage percentage of the compacts for the hub and vanes.

SUMMARY OF THE INVENTION

In accordance with the patent invention, there is provided a sintered body assembly which comprises an outer section and an inner section at least partly surrounded by the outer section. The inner and outer section are formed from independent compacts. The compact for the outer section is larger in shrinkage percentage at the time of sintering than the compact for the inner section. The compacts are joined and subjected to sintering to form the inner and outer sections.

In accordance with the present invention, there is also provided a method of producing a sintered body assemly. The method comprises preparing an inner compact corresponding to an inner section of the sintered body assembly and having a predetermined shrinkage percentage at the time of sintering, preparing an outer compact corresponding to an outer section of the sintered body assembly and having a shrinkage percentage at the time of sintering larger than that of the inner compact, and subjecting the inner and outer compacts to sintering and allowing same into a single sintered body.

In one form of the method, each of the first mentioned preparing and the second mentioned preparing comprise shaping the inner and outer compacts in such a way that a clearance is provided between the compacts.

The above device and method of this invention is effective for overcoming the above noted problems.

It is accordingly an object of the present invention to provide a novel method of producing a sintered body assembly which can efficiently prevent cracks, breakages, incomplete joining, etc. otherwise occuring in products.

It is a further object of the presnet invention to provide a novel method of the above character which can reduce the rated number of defficient products.

It is a further object of the present invention to provide a novel method of the above character which can improve the performance efficiency as well as the quality of the product.

It is a further object of the present invention to provide a sintered body assembly which is produced by the method of the above character.

BRIEF DESCRIPTION OF THE DRAWINGS

FIG. 3 is a view similar to FIG. 2 but showing a further embodiment of the present invention;

FIGS. 4A and 4B are sectional views of a swirler-equipped nozzle according to a further embodiment of the present invention;

DETAILED DESCRIPTION OF THE PREFERRED EMBODIMENTS

Figure 1:
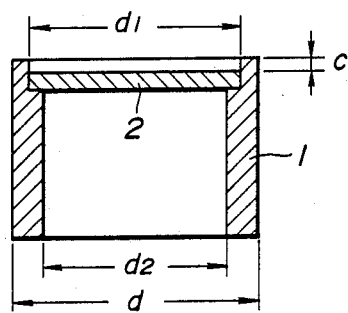
FIG. 1 is a sectional view of a tappet for a valve train in an internal combustion engine according to an embodiment of the present invention.

FIG. 1 shows a tappet for an internal combustion engine according to an embodiment of the present invention. The tappet is so shaped as to have a tubular section 1 and a circular end plate section 2 at an end of the tubular section 1, i.e., the tappet is formed from a tubular compact 1 and circular end plate compact 2 which are prepared independently from each other.

The tubular compact 1 is formed from powder mass or body of silicon nitride and shaped by pressing of 1000 kg/cm$^2$ whilst at the same time being adjusted in density in such a way that its shrinkage percentage at the time of sintering is 16.5% such that after the sintering its sintered sectin 1 is sized to be 35 mm in outer diameter d and 27 mm in inner diameter $d_2$. The joining portion $1a$ of the tubular compact 1 for joining with the end plate compact 2 is processed by turning so as to be 35.95 mm in inner diameter $d_1$.

The compact 2 is in the form of a circular plate or disk and adapted to be fitted in the above described joining portion 1a at an end of the tubular compact 1. The compact 2 is formed from the same powder mass or body of the same lot as that of the compact 1 and shaped by pressing of 1300 kg/cm$^2$ whilst at the same time being adjusted in density in such a way that its shrinkage percentage at the time of sintering is 16%. The compact 2 is shaped so as to be 35.90 mm in outer diameter before sintering.

The compacts 1 and 2 are assembled together as shown and subjected to sintering at a predetermined temperature and for a predetermined time whereby for the sake of the shrinkage percentage differential the compacts 1 and 2 are caused to fill the clearance therebetween (0.05 mm is diameter) and integrally joined to form the tappet of a single sintered body when the sintering is completed.

in the meantime, an excess length portion of the tubular section 1 is indicated by the character "C" in FIG. 1. Such an excess length portion "C" is effective for increasing the regidity at which the end plate section 2 is joined with the tubular section 1 since the excess length portion "C" shrinks more largely than the remaining portion of the tubular section 1.

Figure 2:
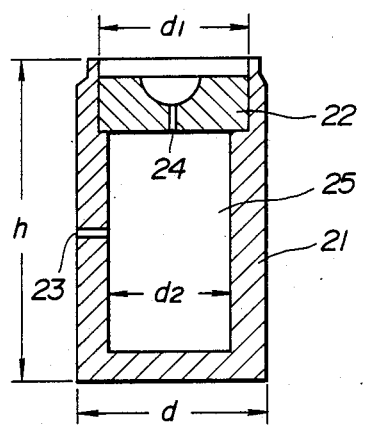
FIG. 2 is a sectional view of a valve lifter according to another embodiment of the present invention.

FIG. 2 shows a ceramic valve lifter for an overhead-valve engine according to another embodiment of the present invention. The valve lifter consists of a tubular section 21 and a circular end plate section 2 for supporting thereon a push rod (not shown), i.e. the valve lifter is formed from a tubular compact 21 and a circular end plate compact 22 which are prepared independently from each other.

The tubular compact 21 is formed from powder mass or body of silicon nitride and shaped by pressing of 1000 kg/cm$^2$ whilst at the same time being adjusted in density in such a way that its shrinkage percentage at the time of sintering is 17 % is such that after the sintering its sintered body 21 is sized to be 22 mm in outer diameter d, 50 mm in height h and 14 mm in inner diameter $d_2$. The compact 21 has at its outer end a joining portion which is processed by turning so as to be 20.00 mm in inner diameter $d_1$ before sintering.

The compact 22 is in the form of a circular plate or disk having a recess for receiving therein a spherical end of a push rod (not shown). The compact 22 is formed from the same powder mass or body as that of the compact 21 but of the different lot and shaped by pressing of the same pressure as that of the compact 21 whilst at the same time being adjusted in density in such a way that its shrinkage percentage at the time of sintering is 16%. The compact 22 is processed by turning so as to be 19.95 mm in outer diameter. Indicated by the reference numerals 23 and 24 are oil passages of the diameter of about 1 mm.

The compacts 21 and 22 are assembled together as shown and subjected to sintering at a predetermined temperature and for a predetermined time whereby for the sake of the shrinkage percentage differential the compacts 21 and 22 are caused to fill the clearance (0.05 mm in diameter) therebetween and intrgrally joined to form the valve lifter of a single sintered body when the sintering is completed. A sintered boy which is not formed with such oil passages 23 and 24 can be produced in the same manner as above.

FIG. 3 shows another ceramic valve lifter for an overhead-valve engine according to a further embodiment of the present invention. The valve lifter is so shaped as to have a tubular section 31 and an end plate section 32, i.e., the valve lifter is formed from a tubular compact 31 and an end plate compact 32 which are prepared independently from each other.

The tubular compact 31 has a closed end and an open end. The compact 31 is formed from powder mass or body of silicon nitride and shaped by pressing of 1500 kg/cm$^2$ whilst at the same time being adjusted in density in such way that its shrinkage percentage at the time of sintering is 16%.

The compact 32 is in the form of a circular plate or disk and adapted for installation in the open end of the tubular compact 31. The compact 32 is formed from powder mass or body of sialon and shaped by pressing of 1500 kg/cm$^2$ whilst at the same time being adjusted in density in such way that its shrinkage percentage at the time of sintering is 14%.

The compacts 31 and 32 are shaped and sized substantially the same as the compacts 21 and 22 in the embodiment of FIG. 2 except that the tubular compact 31 has at the inner periphery an annular groove 33 and that the compact 32 is adapted for installation in the groove 33. The groove 33 is located adjacently inward of the open end portion 34 which is processed by turning so as to be 19.76mm in diameter $d_1$. The groove 33 is processed by turning so as to be 20.24 mm in inner diameter $d_4$ and 10.3 mm in height $h_1$. The compact 32 is processed by turning so as to be 19.53 mm in outer diameter $d_3$ and 10 mm in height $h_2$.

The compacts 31 and 32 are assembled by inserting the compact 32 into the groove 33 through the open end portion 34 and subjected to sintering at a predetermined temperature and for a predetermined time whereby for the sake of the shrinkage percentage differential of 2% the outer diameter $d_3$ of the sintered end plate section 32 becomes larger than the diameter $d_1$ of the open end portion 32 but smaller than the inner diameter $d_4$ of the groove 33, thus allowing the compact 32 to be retained in the groove 33 in such a way as to be rotatable therein. In the meantime, indicated by the reference numral 35 is a vacant space defined in the valve lifter.

FIGS. 4A and 4B show a swirler-equipped nozzle according toa further embodiment of the present invention. The nozzle consists of a tubular nozzle section 41 and a swirler section 42, i.e., the nozzle is formed from a tubular nozzle compact 41 and a swirler compact 42 which are prepared independently from each other.

The tubular nozzle compact 41 is formed from powder mass or body of silicon nitride and shaped by pressing of 1500 kg/cm$^2$ whilst at the same time being adjusted in density in such a way that its shrinkage percentage at the time of sintering is 16% such that after the sintering the sintered nozzle section 41 is sized to be 12 mm in outer diameter and 7 mm in inner diameter.

The compact 42 is in the form of a cylindrical body to be fitted in the compact 41. The compact 42 is formed from powder mass or body of sialon and shaped by pressing of 1500 kg/cm$^2$ whilst at the same time being adjusted in density in such a way that its shrinkage percentage at the time of sintering is 14%. The compact 42 is processed by turning so as to be 8.29 mm in outer diameter. The compact 41 is processed by turning so as to be 8.43 mm in inner diameter $d_1$. The compact 42 is formed with a plurality of helical grooves 43 of a semicircular cross section at the outer periphery and a through hole 44 of a diameter of 1 mm at the center thereof. Indicated by the reference numeral 45 is an injection orifice formed in the tubular compact 41 at an end thereof.

The compacts 41 and 42 are assembled as shown and subjected to sintering at a predetermined temperature and for a predetermined time whereby the compacts 41 and 42 are integrally joined to form the nozzle of a single sintered body.

According to a modification of the present invention, the swirler section 42 may otherwise be installed in the tubular section 42 in such a way as to be rotatable whilst being retained in the tubular section 42. This is attained by constructing the tubular section 41 and the swirler section 42 similarly to the embodiment of FIG. 3.

Figure 5A:
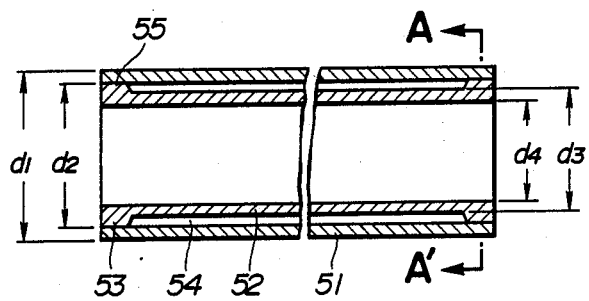
FIG. 5A is a longitudinal sectional view of a dual-walled heat insulating pipe according to a further embodiment of the present invention.
Figure 5B:
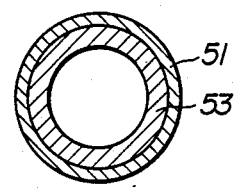
FIG. 5B is a sectional view taken along the line 5B—5B in FIG. 5A.

FIGS. 5A and 5B show a dual-walled heat insulating pipe according to a further embodiment of the present invention. The insulating pipe consists of an outer tubular section 51 and an inner tubular section 52, i.e., the heat insulating pipe is formed form an outer tubular compact 51 and an inner tubular compact 52 which are prepared independently from each other.

The outer tubular compact 51 is formed from powder mass or body of sialon and shaped by pressing of 900 kg/cm² whilst at the same time being adjusted in density in such a way that its shrinkage percentage at the time of sintering is 17% such that after the sintering its sintered body is sized to be 60 mm in outer diameter $c_1$, 52 mm in inner diameter $d_2$ and 150 mm in length. The opposite end portions of the compact 51 for joining with the inner compact 52 is processed by turning so as to be 62.60 mm in inner diameter.

The inner compact 52 is formed from the same material as that of the compact 51 and shaped by pressing of 1200 kg/cm² whilst being adjusted in density in such a way that its shrinkage percentage at the time of sintering is 16.6% such that after sintering its sintered body is sized to be 44 mm in outer diameter $d_3$ and 36 mm in inner diameter d .

The compact 52 has at the opposite end portions thereof radially outward flanges 53 which extend axially inwardly from the terminal ends of the compact 52 and have the axial length of 10 mm. The compact 52 is engaged at the flanges 53 with the above described opposite end portions of the compact 51. The flanges 53 of the compact 52 are processed by turning so as to be 62.40 mm in outer diameter before sintering. indicated by the reference numeral 54 is a vacant space defined between the outer and inner tubular compacts 51 and 52.

The compacts 51 and 52 are assembled as shown and subjected to sintering at the temperature of 1700° C. whereby for the sake of the shrinkage percentage differential of 0.4% the compacts 51 and 52 are caused to fill the clearance (0.2 mm in diameter) and integrally joined to form the dual-walled heat insulating pipe of a single sintered body.

Experiments were conducted to examine the leakage or air tightness of the joint of the outer and inner tubular sections 51 and 52 by cutting the pipe at the axially centeral portion thereof and by the use of helium gas. By the experiments, no leakage was found at the joint of the outer and inner tubular sections 51 and 52, assuring that an air tight seal of the space 54 was attained. The pressure within the space 54 changes from the atomospheric pressure to 0.15 times of the atmospheric pressure as the temperature of the pipe falls from 1700° C. at the time of sintering to the room temperature.

According to a modification of the present invention, the dual-walled heat insualtion pipe of FIGS. 5A and 5B may otherwise be made of iron-coppperbased alloy by powder metallurgy. When this is the case, the compact 51 is formed from powder mass or body of iron-copper-based alloy containing 6% by weight of copper and shaped by pressing of 3000 kg/cm² in such a way that its shrinkage percentage at the time of sintering is 3% such that after the sintering the sintered outer wall section 51 has the same dimensions as mentioned above. The opposite end portions of the compact 51 for engagement with the inner tubular compact 52 is processed by turning so as to be 53.56 mm in inner diameter.

The inner tubular compact 52 is formed from powder mass or body of iron-copper-based alloy containing 6% by weight of copper and shaped by pressing of 3000 kg/cm² in such a way that its shrinkage percentage at the time of sintering is 1.6% such that after sintering the sintered inner wall section 52 has the same dimensions as mentioned above. The flanges 53 are processed by turning so as to be 52.85 mm in outer diameter before sintering.

The compacts 51 and 52 formed from the above metallurgy powders are assembled and subjected to sintering at the temperature of 1200° C. whereby by the effect of the shrinkage percentage differential of 1.4 % the compacts 51 and 52 are caused to fill the clearance (0.71 mm in diameter) and integrally joined to form the dual-walled heat insulation pipe of a single sintered body.

Figure 6A:
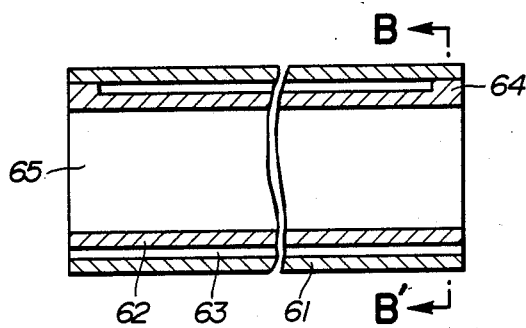
FIG. 6A is a view similar to FIG. 5A but showing a further embodiment of the present invention.
Figure 6B:
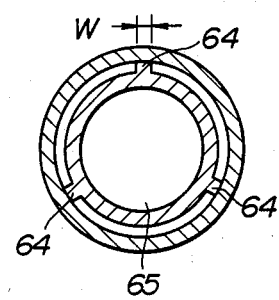
FIG. 6B is a sectional view taken along the line 6B—6B in FIG. 6A.

FIG. 6 shows another dual-walled heat insulation pipe according to a further embodiment of the present invention. The heat insulating pipe consists of an outer tubular section 61 and an inner tubular section 62 which are joined in such a way as to define therebetween a vacant space 63 opening to the outside at the opposite aixal ends, i.e., the heat insulating pipe is formed from an outer tubular compact 61 and an inner tubular compact 62 which are prepared independently from each other.

The main dimensions and the producing method of the outer and inner tubular compacts 61 and 62 are substantially the same as those of the previous embodiment of FIGS. 5A and 5B except that the inner tubular compact 62 has at the opposite end portions thereof ribs 64 which are arranged on the outer periphery of the compact 62 at an interval of 120° and have, after sintering, the width "w" of 8 mm and the length of 20 mm so that the space 63 between the outer and inner tubular sections 61 and 62 is communicated with the outside.

By constructing so that the space 63 is communicated with the outside, fluid can flow through the space 63 for cooling or heating the fluid passing through the passage 65.

According to a modification of the present invention, the dual-walled heat insulating pipe may otherwise be made of tungustem carbide-cobalt-based alloy by powder metallurgy. When this is the case, the outer tubular compact 61 is formed from powder mass or body of tungustem carbide-cobalt-based alloy and shaped by pressing of 1500 kg/cm² whilst at the same time being adjusted in density in such a way that its shrinkage percentage at the time of sintering is 20.5%. The opposite end portions of the compact 61 for engagement with the ribs 64 of the inner tubular compact 62 is processed by turning so as to be 65.35 mm. The inner tubular compact 62 is formed from the same metallury powders as those of the outer tubular compact 62 and shaped by pressing of 1700 kg/cm² whilst being adjusted in density in such a way that its shrinkage percentage at the time of sintering is 19.5%. The ribs 64 are processed by turning so as to be 64.6 mm in outer diameter.

The compacts 61 and 62 are assembled and subjected to sintering at the temperature of 1450° C. whereby by the effect of the shrinkage percentage differential of 1% the compacts 61 and 62 are caused to fill the clearance (0.75 mm in diameter) and integrally joined to form the dual walled heat insulation pipe of a single sintered body.

Figure 7:
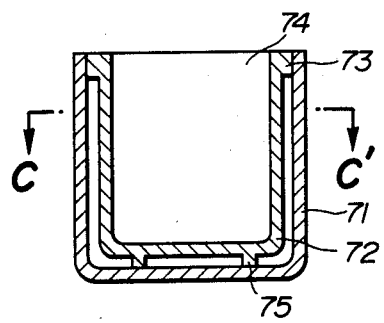
FIG. 7 is a longitudinal sectional view of a heat insulating container made of ceramics according to a further embodiment of the present invention.

FIG. 7 shows a heat insulating container made of ceramics according to a further embodiment of the present invention. The container consists of an outer wall section 71 and an inner wall section 72, i.e., the container is formed from an outer wall compact 71 and an inner wall compact 72 which are prepared independently from each other.

The compacts 71 and 72 are similar to the compacts 51 and 52 of the embodiment of FIGS. 5A and 5B with respect to the dimensions of the sectional structure taken along the line C-C', component powders and the structure and dimensions of the joint 73. The inner wall compact 72 is sized so that its space 74 is 80 mm in depth. The outer and inner wall sections 71 and 72 are 4 mm in thickness and are arranged at a distance of 4 mm. The inner wall compact 71 has at the bottom wall three projections 75 of diameter of 5 mm for thereby being supported on the outer wall compact 71. The outer and inner wall compacts 71 and 72 are joined and secured to each other at the joint 72 in the way similar to the embodiment of FIGS. 5A and 5B. In the meantime, it is not always necessitated that the projections 75 are integrally joined with the outer wall section 71.

Figure 8:
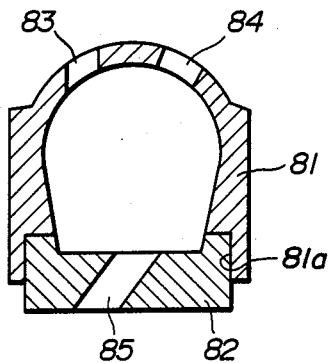
FIG. 8 is a sectional view of a ceramic precombustion chamber unit for an internal combustion engine according to a further embodiment of the present invention.

FIG. 8 shows a ceramic procombustion chamber insert or unit to be installed in a cylinder head of an internal combustion engine such as a diesel engine according to a furthr embodiment of the present invention. The precombustion chamber unit consists of a housing section 81 and a base section 82, i.e., the precombustion chamber unit is formed from a housing compact 81 and a base compact 82 which are prepared independently from each other.

The housing compact 81 is formed from powder mass or body of sialon which is excellent in property of heat insulation and shaped by injection molding whilst being adjusted in density in such a way that its shrinkage percentage at the time of sintering is 16%. The joining portion 81a of the compact 81 for joining with the base compact 82 is processed by turning so as to be 7 mm in length and 29.75 mm in inner diameter. The compact 81 has at the top thereof a hole 83 for installation of a glow plug and a hole 84 for installation of an injector nozzle.

The base compact 82 is formed from powder mass or body of silicon nitride so that the base section 82 has a larger heat conductivity than the housing section 81 for thereby reducing the thermal stress arising in the base section 82 at the time of operation of the engine. The base compact 82 is shaped by pressing of 1200 kg/cm² whilst being adjusted in density in such a way that its shrinkage percentage at the time of sintering is 15.3%. The compact 82 is processed by turning after the pressing so as to be 29.57 mm in outer diameter and formed with a connecting passage 85 for connecting the pre-combustion chamber to, though not shown, a main combustion chamber or a space above the piston.

The housing compact 81 and the base compact 82 are assembled as shown and subjected to sintering at a predetermined temperature and for a predetermined time whereby for the sake of the shrinkage percentage differential of 0.7% the compacts 81 and 82 are caused to fill the clearance (0.18 mm in diameter) therebetween and integrally joined to form the precombustion chamber unit of a single sintered body.

Figure 9:
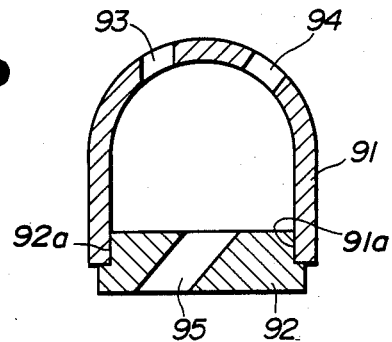
FIGS. 9 and 10 are views similar to FIG. 8 but showing further embodiments of the present invention.

FIG. 9 shows another precombustion chamber unit according to a further embodiment of the present invnetion. The precombustion chamber consists of a housing section 91 and a base section 92, i.e., the precombustion chamber unit is formed from a housing compact 91 and a base compact 92 which are prepared independently from each other.

The compact 91 is formed from powder mass or body of sialon and shaped by pressing of 1000 kg/cm² whilst at the same time being adjusted in density in such a way that its shrinkage percentage at the time of sintering is 15.8% such that after the sintering the sintered head section 91 has an outer diameter of 32 mm. The joining portion 91a of the compact 91 for joining with the base compact 92 is processed by turning so as to be 30.82 mm in inner diameter and 6 mm in length. The compact 91 has at the top thereof a hole 93 for installation of a glow plug and a hole 94 for installation of an injector nozzle. The base compact 92 is formed from the same material and shaped by pressing of the same pressure as the base section 82 of the previous embodiment of FIG. 8. The base compact 92 is adjusted in density in such a way that its shrinkage percentage at the time of sintering is 15.3%. The joining portion 92a of the compact 92 for joining with the housing compact 91 is processed by turning after the pressing so as to be 30.70 mm in outer diameter and formed with a connecting passage 95.

The compacts 91 and 92 are assembled as shown and subjected to sintering at a predetermined temperature and for a peredetermined time whereby for the sake of the shrinkage percentage differential of 0.5% the compacts 91 and 92 are caused to fill the clearance (0.12 mm in diameter) and integrally joined to form the precombustion chamber unit of a single sintered body. the precombustion chamber unit of this structrte has an advantage that its compacts 91 and 92 are easy in unloading from the molds.

Figure 10:
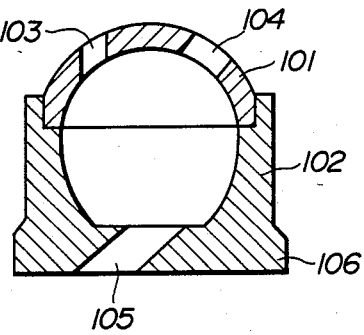

FIG. 10 shows a further precombustion chamber unit according to a further embodiment of the presnet invention. The precombustion chamber consists of a housing section 101 and a base section 102, i.e., the precombustion chamber unit is formed from a housing compact 101 and a base compact 102 which are prepared independently from each other. The housing compact 101 is adapted to define nearly upper half of the precombustion chamber whilst the base compact 012 is adapted to define the remaining portion of the precombustion chamber for the purpose of making the unloading of the compacts 101 and 102 from the molds easy.

The housing compact 101 is formed from powder mass or body of sialon similarly to the chamber compact 81 of the embodiment of FIG. 8 and shaped by pressing of 1300 kg/cm² whilst being adjusted in density in such a way that it shrinkage percentage at the time of sintering is 15%. The joining portion of the compact 101 for joining with the compact 102 is processed by turning after pressing so as to be 33.00 mm in outer diameter. The compact 101 has at the top[thereof a hole 103 for installation of a glow plug and a hole 104 for installation of an injector nozzle.

The base compact 102 is formed from powder mass or body of silicon nitride similarly to the base compact 92 of the embodiment of FIG. 9 and shaped by pressing of 1100 kg/cm² whilst being adjusted in density in such a way that its shrinkage percentage at the time of sintering is 15.5%. The joining portion of the compact 102 for joining with the compact 101 is processed by turning after the pressing so as to be 33.13 mm in inner diameter and 7 mm in length. The compact 102 has at a bottom wall thereof a connecting passage 105.

The compacts 101 and 102 are assembled as shown and subjected to sintering at a predetermined temperature and for a predetermined time whereby for the sake of the shrinkage percentage differential of 0.5 % the compacts 101 and 102 are caused to fill the clearance (0.13 mm in diameter) and integrally joined to form the precombustion chamber unit of a single sintered body.

In case of forming a ceramic precombustion chamber unit for an internal combustion engine, it is desirable that a base section has a good heat resistivity since it is used under severe temperature conditions whilst the housing section has a low heat conductivity or an excellent heat insulating property in order to improve the thermal efficiency of the engine. In accordance with the present invention, it becomes possible to form the housing section and the base section from a heat resisting material and a heat insulating material, respectively, thus making it possible to attain a precombustion chamber unit of a high performance efficiency and quality.

In the foregoing, it is to be noted that an outer compact "A" and an inner compact "b" as for example the tubular compact 1 and the end plate compact 2 in the embodiment of FIG. 1, respectively are prepared so as to be a >b "a" and "b" are the shrinkage percentages of the compacts "a" and "b", respectively. Such difference in shrinkage percentage can be attained by the the following methods.

(1) The compacts "A" and "b" are formed from the same powder mass or body and adjusted in density so as to be $\rho_A < \rho_B$ where $\rho hd A$ and $\rho_B$ are the densities of the compacts "a" and "b". In this instance, when both of the compacts "a" and "b" are shaped by pressing, the pressure $P_A$ and $P_B$ of the pressing to be applied to the compacts "a" and "b" are determined so as to be $P_A < P_B$. Such difference in density can otherwise be attained by forming the compacts ""a" and "b" by different forming processes as injection molding and pressing.

(2) Even when the compacts "a" and "b" are formed from the same powder mass or body and shaped by the same method, the shrinkage percentages of the compacts "A" and ""B" are not always the same but can be different from each other due to the possible variations of the density between the power masses or bodies of the different lots. This variations of the shrinkage percentage in the powder masses or bodies of the different lots can be used to the above difference in shrinkage percentage.

(3) The compacts "a" and "B" are formed from the different powders which can be sintered under the same conditions (temperature, atomosphere), for example, the compact "a" is formed from powder of silicon nitride whilst the compact "B" is formed from powders of sialon. The compacts "a" and "B " can otherwise be formed from the powder masses or bodies which are basically the same but respectively mixed with sintering addivites of different kinds or sintering additives of the same kind but of different quantities, and sintered under the same condition.

(4) The compacts "a" and "B" are formed from powder masses or bodies of the same material but of the different particles.

In case of the methods of (2), (3) and (4), the different forming methods are used additionally.

In the foregoing, it is to be noted that when the diameter of the joint at which the compacts are joined ranges from 10 mm to 100 mm, it is desirable to determine the difference of the shrinkage percentages to such a value that ranges from 0.5% to 1%. When the diameter of the joint is less than 10 mm, it is desirable to determine the difference of the shrinkage percentages to about 1% or 2%. When the diameter of the joint is larger than 100 mm, it is desirable to determine the difference of the shrinkage percentages to about 0.5%.

From the foregoing, it will be understood that according to the present invention a clearance is provided between independent compacts before sintering, which clearance can not only be made to disappear after sintering to allow the compacts to form a single sintered body but can effectively prevent cracks, breakage, etc. from occuring in the sintered body, particularly, the outer section thereof corresponding to outer one of the compacts.

It is further to be understood that no binders are utilized in the joint of the compacts, thus making it possible to attain a product of a high quantity.

What is claimed is:

1. A method of producing a sintered body assembly comprising:
    preparing an inner compact corresponding to an inner section of the sintered body assembly and having a predetermined shrinkage percentage at the time of sintering;
    preparing an outer compact corresponding to an outer section of the sintered body assembly and having a shrinkage percentage at the time of sintering larger than that of said inner compact;
    fitting said inner compact in said outer compact; and
    subjecting said inner and outer compacts to sintering and allowing same into an integral unit.

2. A method as set forth in claim 1 wherein each of said first mentioned preparing and said second mentioned preparing comprises shaping said inner and outer compacts in such a way that a clearance is provided between said compacts.

3. A method as set forth in claim 2 wherein each of said first mentioned preparing and said second mentioned preparing further comprises determining said clearance and said shrinkage percentages in such a way that said compacts are caused to fill said clearance at the time of sintering and integrally joined together.

4. A method as set forth in claim 2 wherein each of said first mentioned preparing and said second mentioned preparing further comprises determining said clearance and said shrinkage percentages in such a way that said inner section is movably retained within said outer section.

5. A method as set forth in claim 3 wherein each of said first mentioned preparing and said second mentioned preparing further comprises varying the densities of said inner and outer compacts to adjust the difference of said shrinkage percentages to a predetermined value.

6. A method as set forth in claim 3 wherein each of said first mentioned preparing and said second mentioned preparing further comprises varying additives mexied with a powder body from which said compacts are formed to adjust the difference of said shrinkage percentages to a predetermined value.

7. A method as set forth in claim 3 wherein each of said first mentioned preparing and said second mentioned preparing further comprises varying the particle sizes of powder bodies from which said compacts are formed to adjust the difference of said shrinkage percentages to a predetermined value.

8. A method as set forth in claim 1 wherein each of said first mentioned preparing and said second mentioned preparing comprises determining the difference of said shrinkage percentages to be less than 2%.

9. A method of producing by sintering a tappet for an internal combustion engine, comprising:
preparing an end plate compact corresponding to an end plate section of the tappet and having a predetermined shrinkage percentage at the time of sintering;
preparing a tubular compact corresponding to a tubular section of the tappet and having a shrinkage percentage at the time of sintering larger than that of said tubular compact;
fitting said end plate compact in an end of said tubular compact; and
subjecting said tubular compact and said end plate compact to sintering and allowing same to form a single sintered body.

10. A method as set forth in claim 9 wherein each of said first mentioned preparing and said second mentioned preparing comprise shaping said tubular compact and said end plate compact in such a way that a clearance is provided between said compacts, which clearance is completely filled by said compacts for the sake of the difference of said shrinkage percentages at the end of the sintering.

11. A method as set forth in claim 10 wherein each of said first mentioned preparing and said second mentioned preparing comprise forming said end plate compact and said tubular compact in such a way that the end of said tubular compact in which said end plate compact is fitted has a length larger than the thickness of said end plate compact so as to have an excess length portion extending outwardly from said end plate compact.

12. A method for producing by sintering a valve lifter for an internal combustion engine, the valve lifter having a tubular section and a stationary end plate section for joining with a push rod, the method comprising:
preparing an end plate compact corresponding to the end plate section and having a predetermined shrinkage percentage at the time of sintering;
preparing a tubular compact corresponding to the tubular section and having a shrinkage percentage larger than that of said end plate compact, said tubular compact having an open end and a closed end;
fitting said end plate compact in the open end of said tubular compact; and
subjecting said tubular compact and said end plate compact to sintering and allowing same to be formed into a single sintered body.

13. A method as set forth in claim 12 wherein each of said first mentioned preparing and said second metnioned preparing comprise shaping said end plate compact and said tubular compact in such a way that a clearance is provided between said compacts, which clearance is completely filled by said compacts for the sake of the difference of said shrinkage percentages at the end of the sintering.

14. A method as set forth in claim 13 wherein each of said first mentioned preparing and said second mentioned preparing comprise forming said end plate compact and said tubular compact in such a way that said open end of said tubular compact has a length larger than the thickness of said end plate compact so as to have an excess length portion extending outwardly from said end plate compact.

15. A method of producing by sintering a valve lifter for an internal combustion engine, the valve lifter having a tubular section and an end plate section movably retained in the tubular section, the method comprising:
preparing an end plate compact corresponding to the end plate section and having a predetermined shrinkage percentage at the time of sintering;
preparing a tubular compact corresponding to the tubular section and having a shrinkage percentage larger than that of said end plate compact;
providing said tubular section with an open end;
forming an annular groove in an inner peripheral wall of said tubular section at a location adjacent said open end;
inserting said end plate compact into said annular groove of said tubular compact through said open end; and
subjecting said end plate compact and said tubualr compact to sintering and allowing said end plate compact to be movably retained in said groove at the end of the sintering.

16. A method as set forth in claim 15 wherein said first mentioned preparing and said forming comprise determining the diameter of said end plate section, the diameters of said smaller and larger diameter bore sections and said shrinkage percentages in such a way that the diameter of said smaller diameter bore section is larger before the sintering but smaller after the sintering than that of said end plate compact.

17. A method for producing by sintering a nozzle having a tubular section and a stationary swirler section within the tubular section, the swirler section being in the form of a cylindrical body and having a plurality of fluid passages, the method comprising:
preparing a swirler compact corresponding to the swirler section and having a predetermined shrinkage percentage at the time of sintering;
preparing a tubular compact corresponding to the tubular section and having a shrinkage percentage larger than that of said swirler compact;
fitting said swirler compact in said tubular compact; and
subjecting said swirler compact and said tubular compact to sintering and allowing same to be formed into a single sintered body.

18. A method of producing by sintering a nozzle having a tubular section and a swirler section movably retained within the tubular section, the swirler section being in the form of a cylindrical body and having a plurality of fluid passages, the method comprising:
preparing a swirler compact corresponding to the swirler section and having a predetermined shrinkage percentage at the time of sintering;
preparing a tubular compact corresponding to the tubular section and having a shrinkage percentage larger than that of said swirler compact;
providing said tubular compact with an open end;

forming an annular groove in an inner peripheral wall of said tubular compact at a location adjacent said open end;

determining the diameters of said smaller diameter bore section and said swirler compact in such a way that the diameter of said swirler compact is smaller before sintering but larger after sintering than that of said smaller diameter bore section;

inserting said swirler compact into said groove of said tubular compact through said open end; and subjecting said swirler compact and said tubular compact to sintering and allowing said swirler compact to be movably retained within said larger diameter bore section of said tubular compact.

19. A method of producing by sintering a dual-walled pipe having an inner tubular section, an outer tubular section and a vacant space therebetween, the method comprising:

preparing an inner tubular compact corresponding to the inner tubular section and having a predetermined shrinkage percentage at the time of sintering;

preparing an outer tubular compact corresponding to the outer tubular section and having a shrinkage percentage at the time of sintering larger than that of said inner tubular section;

disposing said inner tubular compact in said outer tubular section; and subjecting said inner and outer tubular section to sintering and allowing same to have portions where they are integrally joined with each other.

20. A method of producing by sintering a dual-walled container having an inner wall section and an outer wall section, comprising:

preparing an innre wall compact corresponding to the inner wall section and having a predetermined shrinkage percentage at the time of sintering;

preparing an outer wall compact corresponding to the outer wall section and having a shrinkage percentage at the time of sintering larger than that of said inner wall compact;

disposing said inner wall compact in said outer wall compact; and subjecting said inner wall compact and said outer wall compact to sintering and allowing same to have portions at which they are integrally joined with each other.

21. A method of producing by sintering a precombustion chamber unit for an internal combustion engine, the precombustion chamber unit having a housing section defining a precombustion chamber and a base section to be disposed between the precombustion chamber and a main combustion chamber, the method comprising:

preparing a base compact corresponding to the base section and having a predetermined shrinkage percentage at the time of sintering;

preparing a housing compact corresponding to the housing section and having a shrinkage percentage at the time of sintering larger than that of said base section;

forming in said housing compact a recessed joining portion;

forming in said base compact a protruded joining portion;

inserting said protruded joining portion into said recessed joining portion; and subjecting said housing compact and said base compact to sintering and allowing same to be formed into a single sintered body.

22. A method as set forth in claim 21 wherein said first mentioned preparing comprises forming said base compact from a material having an excellent heat resistivity, and said second mentioned preparing comprises forming said housing compact from a material having an excellent heat insulating property.

23. A method of producing by sintering a precombustion chamber unit for an internal combustion engine, the precombustion chamber unit having a housing section defining a precombustion chamber and a base section to be disposed between the precombustion chamber and a main combustion chamber, the method comprising:

preparing a housing compact corresponding to the housing section and having a predetermined shrinkage percentage at the time of sintering;

preparing a base compact corresponding to the base section and having a shrinkage percentage at the time of sintering larger than that of said base section;

forming in said base compact a recessed joining portion;

forming in said housing compact a protruded joining portion;

inserting said protruded joining portion into said recessed joining portion; and subjecting said housing compact and said base compact to sintering and allowing same to be formed into a single sintered body.

24. A method as set forth in claim 21 wherein said first mentioned preparing comprises forming said housing compact from a material having an excellent heat insulating property, and said second mentioned preparing comprises forming said base compact from a material having an excellent heat resistivity.

25. A sintered body assembly comprising:
a sintered outer section; and
a sintered inner section at least partly surrounded by said outer secton,
said inner and outer sections being formed from independent compacts, and
said compact for said outer section being larger in shrinkage percentage at the time of sintering than said compact for said inner section.

26. A precombustion chamber unit for an internal combustion engine comprising:
a sintered housing section defining a precombustion chamber and having a recessed joining portion; and
a sintered base section to be disposed between a precombustion chamber and a main combustion chamber of the engine and having a projected joining portion received in said recessed joining portion and integrally joined thereto,
said housing section being formed from a compact of a material having an excellent heat insulating property,
said base section being formed from a compact of a material having an excellent heat resistivity, and
said compact for said housing section being larger in shrinkage percentage at the time of sintering than said compact from said base section.

27. A precombustion chamber unit for an internal combustion engine comprising:
a sintered housing section defining a precombustion chamber and having a projected joining portion; and a sintered base section to be disposed between a pre-combustion chamber and a main combustion chamber of the engine and having a recessed joining portion receiving therewithin said projected joining portion and integrally joined thereto, said housing section being formed from a compact of a material having an excellent heat insulating property, said base section being formed from a compact of a material having an excellent heat resistivity, and said compact for said base section being larger in shrinkage percentage at the time of sintering than said compact for said housing section.

* * * * *